United States Patent
Khessib et al.

(10) Patent No.: US 8,938,529 B2
(45) Date of Patent: Jan. 20, 2015

(54) HARDWARE MANAGEMENT COMMUNICATION PROTOCOL

(71) Applicant: Microsoft Corporation, Redmond, WA (US)

(72) Inventors: Badriddine Khessib, Redmond, WA (US); Sriram Sankar, Redmond, WA (US); Woongki Baek, Daejeon (KR); Sriram Govindan, Redmond, WA (US); Bryan David Kelly, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/927,074

(22) Filed: Jun. 25, 2013

(65) Prior Publication Data

US 2014/0380334 A1    Dec. 25, 2014

(51) Int. Cl.
*G06F 15/173*    (2006.01)
*G06F 9/54*    (2006.01)

(52) U.S. Cl.
CPC ........................................ *G06F 9/54* (2013.01)
USPC .......................................... 709/223; 709/224

(58) Field of Classification Search
CPC ...................... H04L 29/08072; H04L 41/0213
USPC ................................................ 709/223, 224
See application file for complete search history.

(56) References Cited

U.S. PATENT DOCUMENTS

| | | | |
|---|---|---|---|
| 8,332,508 B1 | 12/2012 | Burrell et al. | |
| 8,503,325 B2 * | 8/2013 | Watanabe et al. | 370/252 |
| 2008/0002579 A1 * | 1/2008 | Lindholm et al. | 370/230 |
| 2012/0236866 A1 * | 9/2012 | Endo et al. | 370/392 |
| 2013/0086234 A1 | 4/2013 | Salsburg | |
| 2013/0170451 A1 * | 7/2013 | Krause et al. | 370/329 |

OTHER PUBLICATIONS

"Managing ProLiant Servers with Linux", Retrieved Date: Apr. 25, 2013, pp. 30.
"Intel® Intelligent Power Node Manager 1.5", Dec. 2009, pp. 88.
Dua, Kunal, "Maintaining Server Health", Retrieved Date: Apr. 25, 2013, p. 1.
Bhutani Amit, "Server Management and Monitoring with IPMI", May, 2006, pp. 25.
"MegaRAC® Product Catalog", Retrieved Date: Apr. 25, 2013, pp. 17.

* cited by examiner

*Primary Examiner* — Andy Ho
(74) *Attorney, Agent, or Firm* — Jim Sfekas; Kate Drakos; Micky Minhas

(57) ABSTRACT

A simplified hardware management communication protocol comprises defined request packets, which are utilized to transmit requests to lower layers of management functionality or to managed resources, and it also comprises defined response packets, which are utilized to transmit responses back to the source of the request. A request packet comprises an identification of a type of device, an identifier of that device, an address of the sending entity, a session identifier, a sequence number, a function identifier, and a payload that comprises encapsulated communications or data directed to the request target. A response packet can comprise an identification of the sender of the request, a session identifier, a sequence number, a completion code identifying whether and how the request was completed, and a payload. Managed asset type specific drivers translate into communications utilizing communicational protocols that are specific to the managed assets.

20 Claims, 3 Drawing Sheets

HARDWARE MANAGEMENT COMMUNICATION PROTOCOL

BACKGROUND

The ever increasing availability of high throughput computer network connections has enabled computer processing capability to be distributed among many different computing devices that can be spread out across a variety of physical locations. For example, data centers, housing hundreds or thousands of computing devices, are becoming more commonplace, both among entities that seek to utilize for themselves the processing capabilities supported by such datacenters, and by entities that seek to sell such processing capabilities to others. Irrespective of the manner in which data centers are monetized, each data center, and the computing devices and associated hardware contained therein, can represent a substantial financial investment. More specifically, much of the hardware that comprises a data center, especially the computational hardware, can, not only, require an initial outlay of capital to purchase such hardware, but can also represent a depreciating asset whose value decreases over time.

Consequently, it can be financially beneficial to track hardware to ensure that it is being utilized in an efficient manner and to ensure that operational parameters, such as voltage, current, temperature and other like parameters, are being met. Unfortunately, tracking and managing a myriad of hardware across diverse geographic locations can be difficult to implement. For example, a single data center can comprise thousands of computing devices and associated hardware that can need to be individually tracked and managed. Many organizations, however, can manage multiple data centers that can be spread across diverse geographic locations, exponentially increasing the amount of hardware to be maintained and managed.

Traditional mechanisms for managing hardware, especially large volumes of physically distributed hardware, comprise the utilization of a myriad of complex communicational protocols. Such mechanisms can be inefficient and prone to error.

SUMMARY

In one embodiment, a hardware management communication protocol can act as a wrapper by which communications utilizing other protocols can be routed through multiple layers of management functionality and directed to the appropriate managed resources. The hardware management communication protocol can comprise defined request packets, which can be utilized to transmit requests to lower layers of management functionality or to managed resources. The hardware management communication protocol can also comprise defined response packets, which can be utilized to transmit responses back to the source of the request.

In another embodiment, a request packet can comprise an identification of a type of device to which such a request is directed, an identifier of that device, an address of the entity sending the request packet, a session identifier by which a request and corresponding response can be correlated, a sequence number to provide for the transmission of data exceeding a single packet size, a function identifier by which a requested function can be identified, and a payload that can comprise encapsulated communications or data directed to the target of the request.

In a further embodiment, a response packet can comprise an identification of the sender of the request to which the response is being provided, a session identifier by which the request and corresponding response can be correlated, a sequence number to provide for the transmission of response data exceeding a single packet size, a completion code identifying whether and how the request was completed, and a payload that can comprise encapsulated communications or data directed to the sender of the request.

In a still further embodiment, managed asset type specific drivers can act as a lowest layer of management functionality and can translate between hardware management communications utilizing a hardware management communication protocol and communications utilizing communicational protocols that can be specific to the managed assets themselves.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
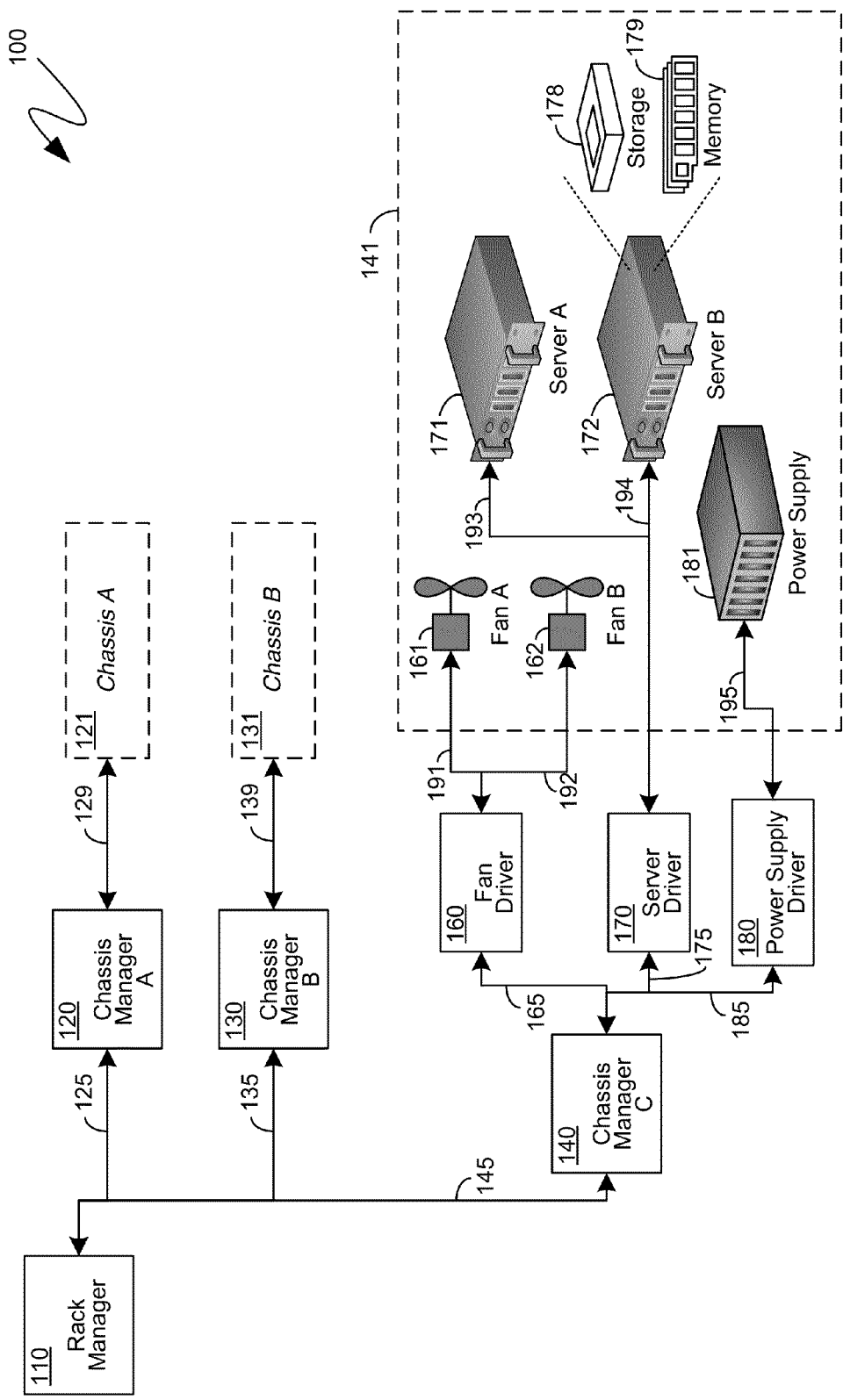
FIG. 1 is a block diagram illustrating an exemplary system implementing an exemplary hardware management communication protocol.

The following description relates to a simplified hardware management communication protocol that can act as a wrapper by which lower-level communications can be routed through multiple management layers. The hardware management communication protocol can comprise defined request packets, which can be utilized to transmit requests to lower layers of management functionality or to managed resources, and it can also comprise defined response packets, which can be utilized to transmit responses back to the source of the request. A request packet can comprise an identification of a type of device to which such a request is directed, an identifier of that device, an address of the entity sending the request packet, a session identifier by which a request and corresponding response can be correlated, a sequence number to provide for the transmission of data exceeding a single packet size, a function identifier by which a requested function can be identified, and a payload that can comprise encapsulated communications or data directed to the target of the request. A response packet can comprise an identification of the sender of the request to which the response is being provided, a session identifier by which the request and corresponding response can be correlated, a sequence number to provide for the transmission of response data exceeding a single packet size, a completion code identifying whether and how the request was completed, and a payload that can comprise encapsulated communications or data directed to the sender of the request. Managed asset type specific drivers can act as a lowest layer of management functionality and can translate between hardware management communications utilizing a hardware management communication protocol and communications utilizing communicational protocols that can be specific to the managed assets themselves.

For purposes of illustration, the techniques described herein are directed to a specific hardware assembly comprising different types of hardware assets. However, references to, and illustrations of, such an assembly, and the specific hardware assets contained therein, are strictly exemplary and are not intended to limit the mechanisms described to the specific examples provided. Indeed, the techniques described are applicable to the monitoring and management of any computing asset arranged and assembled in any sort of configuration or construction. Consequently, references below to specific hardware equally represent any type of managed asset. Similarly, references below to specific assemblies, such as "racks" or "chassis", equally represent any arrangement or delineation of managed assets.

Additionally, although not required, the description below will be in the general context of computer-executable instructions, such as program modules, being executed by one or more computing devices. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments linked through a communications network. In a distributed computing environment, program modules may be located in both local and remote memory storage devices.

With reference to FIG. 1, an exemplary system 100 is illustrated, providing context for the descriptions below. The exemplary system 100 comprises managed assets that are illustrated as being arranged into physical structures, such as chassis. More specifically, the exemplary system 100 of FIG. 1 is illustrated as comprising chassis 121, 131 and 141, which can, themselves, each comprise sub-components in the form of one or more managed assets. To maintain illustrative clarity in FIG. 1, the sub-components of chassis 121 and 131 are not explicitly illustrated. However, the exemplary chassis 141 is shown in the system 100 of FIG. 1 as comprising various managed assets including, for example, fans, such as the fans 161 and 162, server computing devices, such as the servers 171 and 172, and power supplies, such as the power supply 181. As will be understood by those skilled in the art, certain ones of such managed assets can, themselves, include components that can be monitored and managed. By way of illustration, the server 172 is illustrated as comprising storage devices, such as the storage device 178, and memory devices, such as the memory 179.

In one embodiment, the various managed assets, such as those of the exemplary chassis 141, can be managed by multiple layers of management functionality. For example, multiple ones of the chassis 121, 131 and 141 can be aggregated together into a single physical, or logical, construct, which, for ease of reference, will be referred to herein as a "rack". Correspondingly, a rack manager 110 can be associated with such a rack and can provide monitoring and management functionality thereto. Each individual chassis, such as the exemplary chassis 121, 131 and 141, can be associated with the chassis manager, such as the exemplary chassis managers 120, 130 and 140, respectively. In such an embodiment, the chassis managers 120, 130 and 140 can represent a layer of management functionality below the rack manager 110, such that the chassis managers 120, 130 and 140 receive requests from the rack manager 110, and provide responses thereto.

To facilitate communication with individual ones of the managed assets, such as, for example, those exemplarily illustrated in FIG. 1 as part of the chassis 141, a chassis manager can utilize another layer of management functionality that can comprise asset-specific communicational capabilities, and which will be referred to herein as "drivers". Thus, for example, the system 100 of FIG. 1 illustrates an exemplary fan driver 160 that can interface with the fans of the chassis 141, such as the fans 161 and 162. Similarly, a server driver, such as the exemplary server driver 170, can interface with the servers 171 and 172, and a power supply driver, such as the exemplary power supply driver 180, can interface with the power supply 181. Although the drivers shown in FIG. 1 are illustrated as class-specific drivers such that a driver is associated with all instances of managed assets belonging to a particular class of managed assets, in other embodiments drivers can be specific to individual assets. As an illustrative example, while the fan driver 160 is illustrated in FIG. 1 as interfacing with all instances of fans in the chassis 141, in another embodiment, the fan driver 160 could interface only with the fan 161 and a different fan driver could interface with the fan 162. Additionally, the term "driver", as utilized herein, refers only to a component that can translate communications into a form natively understandable by a managed asset, and does not mean an operating system driver.

As illustrated in FIG. 1, the system 100 can comprise communicational pathways 125, 135 and 145 between the rack manager 110 and individual ones of the chassis managers 120, 130 and 140, respectively. Additionally, each of the chassis managers can comprise communicational pathways to their respective chassis. For example, the chassis manager 120 can comprise a communicational pathway 129 to one or more of the managed assets that comprise the chassis 121. Similarly, the chassis manager 130 can comprise communicational pathway 139 to one or more of the managed assets that comprise the chassis 131. In one embodiment, the communicational pathways between the chassis manager and individual ones of the managed assets comprising the chassis associated with the chassis manager can include one or more drivers for translating chassis manager communications into communications that can be natively understood by the managed assets. Consequently, as shown in the system 100 of FIG. 1, the chassis manager 140 can comprise communicational pathways 165, 175 and 185 between it and one or more of the drivers, such as the fan driver 160, the server driver 170 and the power supply driver 180, respectively. In turn, then, each of such drivers can comprise communication pathways between themselves and one or more of the assets with which they are associated. For example, the fan driver 160 can comprise communicational pathways 191 and 192 between it and the fans of the chassis 141, such as fans 161 and 162, respectively. Similarly, the server driver 170 can comprise communicational pathways 193 and 194 between it and the servers of the chassis 141, such as the servers 171 and 172, respectively, and the power supply driver 180 can comprise a communicational pathway 195 between it and the power supply 181. Additionally, in one embodiment, communicational pathways can exist within managed assets. For example, although not specifically illustrated in FIG. 1, additional communicational pathways can exist within the server devices such as, for example, within the server 172 to enable components of the server 172 to communicate with other components thereof such as, for example, the storage 178 and the memory 179.

In one embodiment, a hardware management communication protocol can be utilized to exchange communications between various layers providing management functionality. For example, such a hardware management communication protocol can be utilized to exchange communications between rack managers, such as exemplary rack manager 110, and chassis managers, such as the exemplary chassis managers 120, 130 and 140. Similarly, that same hardware management communication protocol can also be utilized to exchange communications between chassis managers and instances of drivers that are associated with managed assets that comprise the chassis being managed by those chassis managers. Thus, for example, that same hardware management communication protocol can be utilized to exchange communications between the chassis manager 140 and one or more of the fan driver 160, the server driver 170 and the power supply driver 180.

Each of the fan driver 160, the server driver 170 and the power supply driver 180 can then translate communications corresponding to the hardware management communication protocol into communications that the managed assets can natively understand. As a simple example, the fan 161 can, in the present example, comprise limited communicational functionality that can be so limited as to only understand the presence or absence of voltage on defined pins of a serial interface. In such an extreme example, the fan driver 160 can be compatible with such a fan 161 so that the fan driver 160 can receive communications in accordance with the hardware management medication protocol described below, can extract, from such communications, the function requested of the fan 161, and can correspondingly control the fan 161, such as by applying voltage to appropriate ones of the pins of the serial interface. As another example, one or more of the managed assets can be compatible with existing asset management communication protocols. For example, the storage 178, or the memory 179, can be compatible with known intra-device hardware management protocols. In such an example, the server driver 171 can receive communications in accordance with the hardware management communication protocol described below, can extract, from such communications, the function requested of the storage 178, or the memory 179, and can communicate such requests to the server 172 in the known intra-device hardware management protocols with which the storage 178, or the memory 179, are compatible.

Responses from the managed assets can be, similarly, received by the corresponding drivers utilizing whichever communication protocol is compatible with the managed assets. The drivers can then translate such responses into an appropriate format in accordance with the hardware management communication protocol described below.

Figure 2:
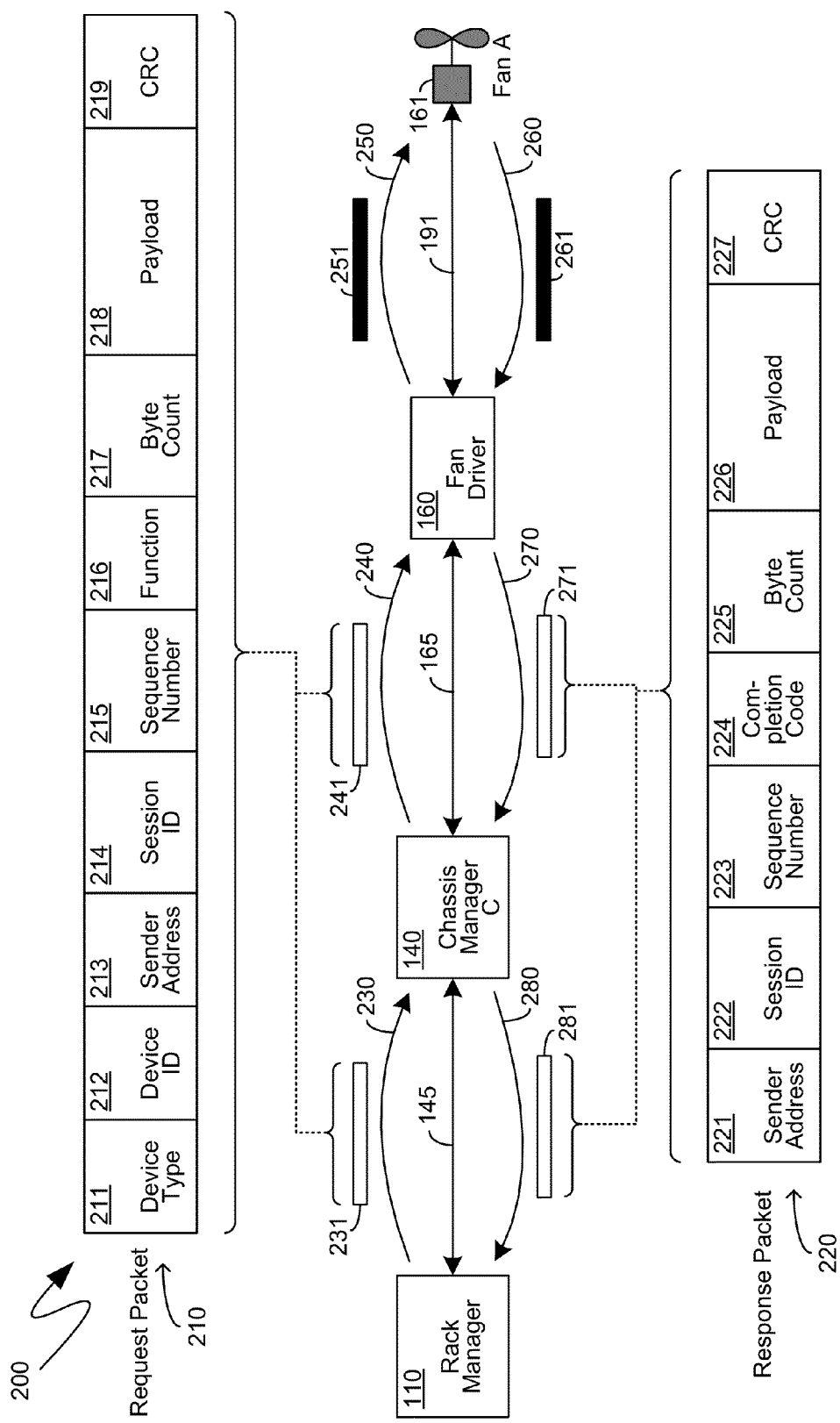
FIG. 2 is a block diagram illustrating exemplary request and response packets of an exemplary hardware management communication protocol.

Turning to FIG. 2, the system 200 shown therein illustrates an exemplary packet structure and communicational exchange of the hardware management communication protocol referenced above. For purposes of illustratively describing a contemplated packet structure and communicational exchange, the communicational exchange of the system 200 is illustrated within the context of communications exchanged between the rack manager 110, the chassis manager 140, the fan driver 160 and the fan 161 that were previously illustrated in FIG. 1. Initially, as shown in the system 200, a request can be communicated from the rack manager 110 to the chassis manager 140 via the communication 230. Such a request can originate with the rack manager 110, for example as part of a periodic request, "heartbeat" communication, or other like automatically triggered action. The request of communication 230 can also originate with an administrative user, or other like entity, that can interact, either directly or indirectly, through still further asset management layers with the rack manager 110.

In one embodiment, the communication 230 can comprise one or more packets 231 that can comprise a structure in accordance with the exemplary request packet 210 that is also shown in FIG. 2. As shown in FIG. 2, the exemplary request packet 210 can comprise device type information 211 that can identify a type of device to which such a communication is ultimately directed. Such device type information 211 can be utilized to differentiate among multiple packets and apply differing treatment to packets specifying differing device types. In one embodiment, the identification of the device type, by the device type information 211, can be based on the categorization of the target device itself, such as, for example, whether the device is a fan, the server, power supply, or the like. In another embodiment, the identification of the device type, by the device type information 211, can be based on the capabilities of the target device, irrespective of its physical manifestation. For example, cooling devices could be a single device type irrespective of whether such devices were fans, thermoelectric components, hydro-cooling apparatuses, or other like cooling devices.

One device type that can be specified by the device type information 211, in one embodiment, can be a control device type that can identify, not a managed asset directly, but rather one or more components or aspects of the asset management system. For example, the exemplary packet 231, that can be communicated from the rack manager 110 to the chassis manager 140 by the communication 230, can comprise device type information 211 that can identifies intermediate management components, such as the chassis manager 140, as the target device for that request. Such device type information 211 can be utilized to communicate requests to other asset management components including, for example, "heartbeat" requests that can be designed to periodically verify proper operation of asset management components, settings requests that can modify one or more operational settings, such as timeout values, and operational requests to restart, apply firmware updates, and the like. In one embodiment, the device type information 211 can be a field in the request packet 210 that is a single byte in size.

The exemplary packet 210 can further comprise device identifying information 212 that can provide a specific identifier of the particular device to which such a communication is ultimately directed. In one embodiment, due to the existence of the device type information 211, the device identifying information 212 need only be unique as among the other devices of the same device type. In another embodiment, however, the device identifying information 212 can be a globally unique identifier. In one exemplary embodiment, the device identifying information 212 can be a field in the request packet 210 that is a single byte in size.

Additional information that can be provided for by the exemplary request packet 210 can include sender address information 213 that can identify the entity transmitting the request, or which can identify a specific port, component, or other like aspect of the transmitting entity. In one embodiment, the sender address information 213 can comprise the addresses of multiple different entities to provide failover functionality. More specifically, in such an embodiment, a response can first be directed to a primary one of the multiple different address information contained in the sender address information 213. If such a response cannot be delivered, such as due to a failure of the entity to which it was directed, that same response, subsequently, can be directed to secondary ones of the multiple different address information contained in the sender address information 213, thereby providing failure tolerance. In one embodiment, the sender address information 213 can be a field in the request packet 210 that is a single byte in size.

The exemplary request packet 210 can also comprise session identifying information 214 that can enable a subsequent response to be correlated with the request to which it is responding. A communicational session can be a single request/response pair, in which case, the single request and the single response can comprise the same session identifying information 214. A communicational session can also span multiple request/response messages, such as in the context of a serial console session. In such an instance, each of the multiple requests and each of the multiple responses can comprise the same session identifying information 214. In one embodiment, the session identifying information 214 can be a field in the request packet 210 that is two bytes in size.

To provide for communication of information or data that can be larger than a single packet, the exemplary request packet 210 can also comprise a sequence number 215 that can provide sequencing information for a series of packets communicating individual pieces of a larger collection of information. More specifically, in one embodiment, the sequence number 215 can be a field in the request packet 210 that can be two bytes in size, where a single bit of those two bytes, such as the highest bit, or sign bit, can be used to indicate if there are additional packets whose payloads are to be concatenated together to form a single communication. In such an example, the thirty-one lower bits can then act as the sequencing information by which those additional packets can be sequenced after receipt.

The exemplary request packet 210 can provide function identification information 216 that identifies the function being requested, if appropriate. In one embodiment, the function identification information 216 can be unique only as to the type of device specified by the device type information 211. As a simple example, a function code of "1" can signify a "get status" function when the device type information 211 indicates that the request packet 210 is being directed to a fan type device. Continuing with such a simple example, the same function code of "1" can signify a "turn on server" function when the device type information 211 indicates that the request packet 210 is being directed to a server type device. In another embodiment, the function identification information 216 can be globally unique as across multiple different types of devices. Examples of functions that can be specified by the function identification information 216 can include the above referenced "get status" functions, as well as functions that set specific values, parameters, or other settings, and functions that direct the targeted device to perform specific actions, such as the above referenced "turn on server" function. In one embodiment, the function identification information 216 can be a field in the request packet 210 that can be a single byte in size.

In addition to the above-described information, the request packet 210 can also comprise a payload 218 that can comprise data relevant to the request of the request packet 210. For example, the payload 218 can comprise communications of varying protocols that have been encapsulated within the currently described protocol, such as by being divided into payloads of request packets. As will be described in further detail below, contents of the payload 218 can be opaque to intermediate management layers utilizing the currently described protocols. In one embodiment, the payload 218 can be up to sixty-four kilobytes long. To specify the size of the payload 218, the request packet 210 can comprise byte count identification information 217 that can, itself, be a field of two bytes in size, and which can contain the value that can specify the size of the payload 218, such as in bytes. To provide for error-checking and data integrity checking, the exemplary request packet 210 can also comprise a Cyclic Redundancy Check (CRC) value 219 that can be utilized to check each received request packet for data integrity in a manner well known to those skilled in the art.

Returning to the exemplary communication 230, referenced previously, the communication 230 can comprise packets, such as exemplary packet 231, that can be in the format of the exemplary request packet 210. Upon receipt of such a packet 231, the chassis manager 140 can identify an appropriate driver to which to direct such a packet 231, such as, for example, based on the device type information 211 and, optionally, the device identification information 212 contained in such a packet 231. In one embodiment, the chassis manager 140 can generate a new packet 241 to communicate to the fan driver 160, such as via the communication 240. Such a new packet 241 can comprise a payload 218 that can comprise the previously received packet 231 that was sent as part of the communication 230 from the rack manager 110 to the chassis manager 140. In such an embodiment, upon receipt of the packet 241, such as via the communication 240, the fan driver 160 can unpack the packet 231 from the payload 218 of the packet 241 and can, based on the packet 231, generate appropriate communications 250 to the fan 161 to instruct the fan in accordance with the request originally transmitted by the rack manager 110. The communication 250, generated by the fan driver 160, can be in accordance with whichever communicational protocol is supported by the fan 161. As indicated previously, such a communication protocol can be very simple, depending on the type of asset, and can include, for example, merely applying the voltage to specific pins of a serial interface. Alternatively, as another example, the communication protocol utilized for the communication 260 can be in accordance with a previously agreed upon, or widely adopted communicational standard that the fan 161 can support. In such an embodiment, the fan driver 160 can be capable of translating between the communicational protocol supported by the fan 161 and communication poor impulse described herein. As an alternative, or in addition, one or more of the management components, such as the rack manager 110 or the chassis manager 140, can support the communicational protocol supported by the fan 161. In such an alternative embodiment, a packet 251, in accordance with the communicational protocol supported by the fan 161, can be generated by, for example, the rack manager 110, or even higher level management processes communicating with the rack manager 110, and can be encapsulated by the rack manager 110 into the payload 218 of the packet 231. The packet 231 could then be encapsulated into the payload 218 of the packet 241 and, upon receipt, by the fan driver 160, of the packet 241, the fan driver 160 could unpack the packet 231 and, subsequently, unpack the packet 251 from the packet 231, and then transmit the packet 251 to the fan 161 via of the communication 250.

In response to the communication 250, the fan 161 can, in one embodiment, generate a response of communication 260 that can comprise packets, such as the packet 261, that can be in accordance with the communication protocol supported by the fan 161. To illustrate that the packets 251 and 261 may differ from the communication protocol described herein, they are shown in solid black, versus the white fill of the packets 231 and 241, which were described in detail above, and the packets 271 and 281, which will be described in further detail below. Once the fan driver 160 receives the responsive communication 260, it can generate a response of communication 270 to the chassis manager 140. The response of communication 270 can comprise packets, such as the packet 271, which can be in a form illustrated by the exemplary response packet 220 shown in the system 200 of FIG. 2.

Like the sender address information 213 of the exemplary request packet 210, the exemplary response packet 220 can, likewise, comprise sender address information 221. In one embodiment, the sender address information 221, of the response packet 220, can simply be copied from, or otherwise obtained from, the sender address information 213 of a corresponding request packet. The sender address information 221, of the response packet 220, can enable response packets, such as the exemplary response packet 220, to be directed to an appropriate entity, such as the entity originating the request.

Additionally, the response packet 220 can further comprise session identification information 222. The session identification information 222 can, like the session identification information 214, of the exemplary request packet 210, identify a specific communicational session. Indeed, in one embodiment, the session identification information 222, of the response packet 220, can simply be copied from, or otherwise obtained from, the session and identification information 213 of a corresponding request packet.

The response packet 220 can also comprise a sequence number 223 that can be analogous to, though not necessarily equivalent to, the sequence number 215 of the exemplary request packet 210. As before, the sequence number 223 of the response packet 220 can indicate whether additional packets are to be expected that comprise additional portions of a single communication that was packetized across multiple response packets. For example, in one embodiment, the most significant bit, or sign bit, can indicate whether subsequent packets comprise additional portions of a single communication that was packetized across multiple response packets, while the remaining thirty-one bits, of the two byte sequence number, can provide the sequencing information.

Completion code information 224 can, in one embodiment, provide a status associated with a performance of the requested function by the targeted asset, including an indication of whether, in what manner, the requested operation was, or was not, performed. For example, a completion code of "0" can be indicative of a lack of support of the function specified by the function information 216 of the request packet 210. As another example, a completion code of "1" can represent a successful completion of the function requested via the request packet 210. As yet another example, completion codes "2" can represent various error conditions such as, for example, that the requested function timed out, that the requested function returned an invalid response, and the like. Such completion code information 224 can be based on information generated from the managed asset itself. For example, the fan 161 could indicate, via the communication 260, that it is experiencing an error such as, for example, an under-voltage condition. Such an indication can be in the form of a code that the fan driver 160 can translate into an appropriate error completion code. Alternatively, the completion code information 224 can be generated by one of the management layers such as, for example, the fan driver 160. For example, the fan driver 160 can, upon receiving no response from the fan 161 within a predetermined period of time, itself generate a completion code indicating that the requested function timed out. In one embodiment, the completion code information 224 can be a field in the response packet 220 that can be a single byte in size.

The exemplary response packet 220 can further comprise byte count information 225, a payload 226 and a CRC value 227 that can be analogous to the byte count information 217, the payload 218 and the CRC information 219, described in detail above. For example, with respect to the payload of 226 of the response packet 220, the chassis manager 140, in the example illustrated by the system 200 of FIG. 2, upon receiving the packet 271, from the van driver 160, can generate a packet 281 that can comprise the packet 271 and the payload 226 of the packet 281. Such a packet 281 can then be communicated, by the chassis manager 140, to the rack manager 110, as illustrated by the communication 280.

Upon receipt of the communication 280, the rack manager 110 can un-package, for example, the response packet 271 and can, thereby, receive a response to the request initially transmitted via the communication 230. In one embodiment, the rack manager 110, or other processes executing higher levels and communicating with the rack manager 110, can understand alternative asset management protocols such as, for example, the protocol implemented by the fan 161. In such an embodiment, the packet 261, generated by the fan 161, can be encapsulated into the payload 226 of the packet 271, generated by the fan driver 160, which can then, in turn, be encapsulated in the payload 226, of the packet 281, generated by the chassis manager 140, such as in the manner described in detail above. In such an embodiment, the rack manager 110, upon receiving the packet 281, can un-package the packet 271, from the payload 226 of the packet 281, and can then further un-package the packet 261, from the payload 226 of the packet 271, and can, thereby, obtain access to the packet 261, which it can either process itself, or provide to higher-level processes.

In one embodiment, drivers, such as the fan driver 160 shown in FIG. 2, can be implemented on the same computing device implementing other management layers such as, for example, the chassis manager 140. In other embodiments, drivers, or functionality that was described above is being provided by such drivers, can be provided by the managed assets themselves. Stated differently, the managed assets can, natively, support the above-described communication protocols. For example, instead of the fan 161, the system 200 of FIG. 2 could comprise a more complex managed asset such as, for example, one of the servers illustrated in the system 100 of FIG. 1. In such an example, a server, such as the server 172, shown in FIG. 1, can, natively, understand the communicational protocol described above. Consequently, in such an example, the server 172 could receive the communication 240 directly. In one embodiment, the communication 240 can comprise packets 241 whose payload 218 can be communications directed to components of the server 172, such as the storage 178 or the memory 179, both illustrated in FIG. 1. In such an embodiment, communications in accordance with known intra-device protocols, such as the protocols by which the server 172 itself communicates with the storage 178 or the memory 179 for management purposes, can be encapsulated into the payload 218 of the packets 231 and, eventually, 241. Upon receipt of such packets, the server 172, itself, could un-package the communications encapsulated within the payloads 218 of those packets and could, thereby, provide those communications, in accordance with the known intra-device protocols, to the storage 178 or the memory 179. A response from the storage 178 with the memory 179 could be packetized and packaged in an analogous manner, except in reverse. In such a manner, a managed asset itself, such as, for example, the server 172, can act as its own driver, such as for further communications with some or all of its constituent components.

Figure 3:
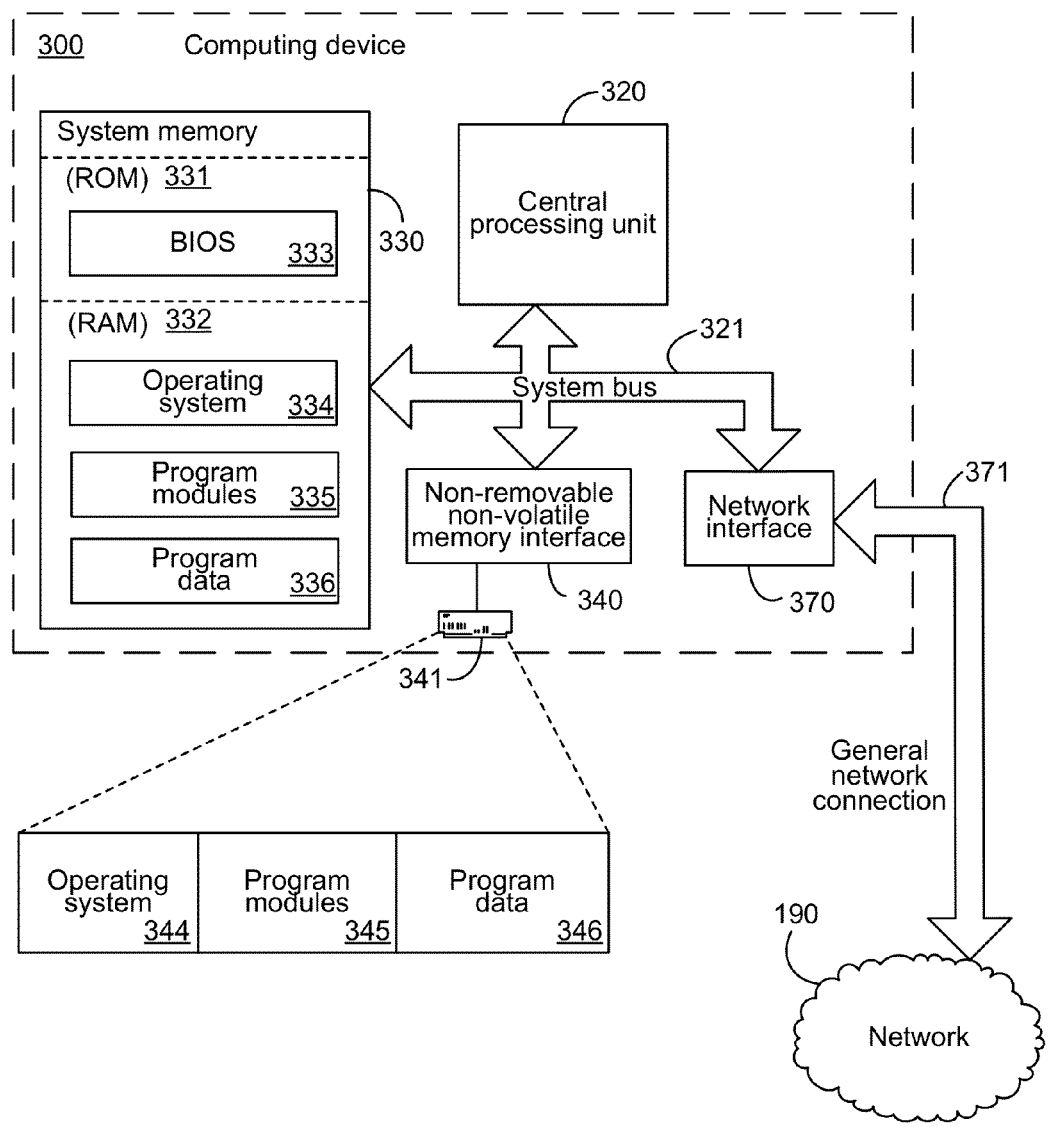
FIG. 3 is a block diagram of an exemplary computing device.

Turning to FIG. 3, an exemplary computing device 300 is illustrated, comprising, in part, hardware elements that can be utilized in performing and implementing the above described mechanisms. The exemplary computing device 300 can include, but is not limited to, one or more central processing units (CPUs) 320, a system memory 330 and a system bus 321 that couples various system components including the system memory to the processing unit 320. The system bus 321 may be any of several types of bus structures including a memory bus or memory controller, a peripheral bus, and a local bus using any of a variety of bus architectures. Depending on the specific physical implementation, one or more of the CPUs 320, the system memory 330 and other components of the computing device 300 can be physically co-located, such as on a single chip. In such a case, some or all of the system bus 321 can be nothing more than silicon pathways within a single chip structure and its illustration in FIG. 3 can be nothing more than notational convenience for the purpose of illustration.

The computing device 300 also typically includes computer readable media, which can include any available media that can be accessed by computing device 300. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 300. Computer storage media, however, does not include communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

When using communication media, the computing device 300 may operate in a networked environment via logical connections to one or more remote computers. The logical connection depicted in FIG. 3 is a general network connection 371 to the network 190 described previously. The network 190 to which the exemplary computing device 300 is communicationally coupled can be a local area network (LAN), a wide area network (WAN) such as the Internet, or other networks. The computing device 300 is connected to the general network connection 371 through a network interface or adapter 370, which is, in turn, connected to the system bus 321. In a networked environment, program modules depicted relative to the computing device 300, or portions or peripherals thereof, may be stored in the memory of one or more other computing devices that are communicatively coupled to the computing device 300 through the general network connection 371. It will be appreciated that the network connections shown are exemplary and other means of establishing a communications link between computing devices may be used.

Among computer storage media, the system memory 330 comprises computer storage media in the form of volatile and/or nonvolatile memory, including Read Only Memory (ROM) 331 and Random Access Memory (RAM) 332. A Basic Input/Output System 333 (BIOS), containing, among other things, code for booting the computing device 300, is typically stored in ROM 331. RAM 332 typically contains data and/or program modules that are immediately accessible to and/or presently being operated on by processing unit 320. By way of example, and not limitation, FIG. 3 illustrates operating system 334, other program modules 335, and program data 336.

The computing device 300 may also include other removable/non-removable, volatile/nonvolatile computer storage media. By way of example only, FIG. 3 illustrates a hard disk drive 341 that reads from or writes to non-removable, non-volatile media. Other removable/non-removable, volatile/non-volatile computer storage media that can be used with the exemplary computing device include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340.

The drives and their associated computer storage media discussed above and illustrated in FIG. 3, provide storage of computer readable instructions, data structures, program modules and other data for the computing device 300. In FIG. 3, for example, hard disk drive 341 is illustrated as storing operating system 344, other program modules 345, and program data 346. These components can either be the same as or different from operating system 334, other program modules 335 and program data 336. Operating system 344, other program modules 345 and program data 346 are given different numbers here to illustrate that, at a minimum, they are different copies.

As can be seen from the above descriptions, an asset management communication protocol has been presented. In view of the many possible variations of the subject matter described herein, we claim as our invention all such embodiments as may come within the scope of the following claims and equivalents thereto.

We claim:

1. One or more computer-readable storage media comprising computer-executable instructions for managing hardware assets, the computer-executable instructions, when executed by one or more processing units of a computing device that is communicationally coupled to the one or more computer-readable media, cause the computing device to perform steps comprising:
   generating a packet comprising:
      a session identifier identifying a communicational session with at least one hardware asset, the communicational session directed to causing the at least one hardware asset to perform a function;

a sequence number either identifying an order of the generated packet among multiple other packets, the multiple other packets and the generated packet each comprising at least a portion of a single communication that was packetized across the multiple other packets and the generated packet, or signifying that none of the multiple other packets follow the generated packet;

a code comprising either a function code identifying the function requested to be performed by the at least one hardware asset, or a completion code identifying a status associated with a performance of the function by the at least one hardware device; and a payload comprising the at least the portion of the single communication; and transmitting the generated packet to another asset management component, the other asset management component executing at a different layer of an asset management system than an asset management component comprising the computer-executable instructions.

2. The computer-readable storage media of claim 1, wherein the generated packet is a request packet, the generated packet further comprising: device type information specifying a type of the at least one hardware asset; and a device identifier specifying a unique identifier for the at least one hardware asset.

3. The computer-readable storage media of claim 1, wherein the generated packet is a response packet, the generated packet further comprising an address of a sender of a request packet comprising a same session identifier as the session identifier of the generated packet.

4. The computer-readable storage media of claim 1, comprising further computer-executable instructions, which, when executed by the one or more processing units, cause the computing device to perform further steps comprising:
receiving a second packet whose structure is equivalent to the generated packet, the received second packet being a request packet requesting the at least one hardware asset to perform the function; and
generating, in response to receiving the second packet, a third packet whose structure differs from the generated packet and the received second packet, the generated third packet being compatible with the at least one hardware asset, the generated third packet requesting the at least one hardware asset to perform the function.

5. The computer-readable storage media of claim 4, wherein the generating the third packet comprises unpacking a payload of the received second packet to obtain the third packet.

6. The computer-readable storage media of claim 1, comprising further computer-executable instructions, which, when executed by the one or more processing units, cause the computing device to perform further steps comprising receiving a second packet;
wherein the computer-executable instructions for generating the packet comprise computer-executable instructions for generating the packet in response to the receiving the second packet;
and wherein further the single communication, at least a portion of which is in the payload of the generated packet, comprises the received second packet.

7. The computer-readable storage media of claim 1, wherein the function comprises at least one of: a status providing function providing a status of at least a portion of the at least one hardware asset, a change setting function directed to changing at least one setting of the at least one hardware asset or a power function directed to turning the at least one hardware asset on or off.

8. A method for managing hardware assets, the method comprising the steps of:
generating, on a computing device comprising one or more processing units and an asset management component, a packet, the packet being generated by the execution of the asset management component by the one or more processing units, the packet comprising:
a session identifier identifying a communicational session with at least one hardware asset, the communicational session directed to causing the at least one hardware asset to perform a function;
a sequence number either identifying an order of the generated packet among multiple other packets, the multiple other packets and the generated packet each comprising at least a portion of a single communication that was packetized across the multiple other packets and the generated packet, or signifying that none of the multiple other packets follow the generated packet;
a code comprising either a function code identifying the function requested to be performed by the at least one hardware asset, or a completion code identifying a status associated with a performance of the function by the at least one hardware device; and
a payload comprising the at least the portion of the single communication; and
transmitting the generated packet to another asset management component, the other asset management component executing at a different layer of an asset management system than the asset management component, the transmitting being performed by the execution of the asset management component by the one or more processing units of the computing device.

9. The method of claim 8, further comprising the steps of:
receiving, by the asset management component being executed by the one or more processing units of the computing device, a second packet whose structure is equivalent to the generated packet, the received second packet being a request packet requesting the at least one hardware asset to perform the function; and
generating, by the asset management component being executed by the one or more processing units of computing device, in response to receiving the second packet, a third packet whose structure differs from the generated packet and the received second packet, the generated third packet being compatible with the at least one hardware asset, the generated third packet requesting the at least one hardware asset to perform the function.

10. The method of claim 9, wherein the generating the third packet comprises unpacking a payload of the received second packet to obtain the third packet.

11. The method of claim 8, further comprising the steps of receiving, by the asset management component being executed by the one or more processing units of the computing device, a second packet;
wherein the generating the packet comprises generating the packet in response to the receiving the second packet;
and wherein further the single communication, at least a portion of which is in the payload of the generated packet, comprises the received second packet.

12. The method of claim 8, wherein the function comprises at least one of: a status providing function providing a status of at least a portion of the at least one hardware asset, a change setting function directed to changing at least one setting of the at least one hardware asset or a power function directed to turning the at least one hardware asset on or off.

13. A system comprising:
- at least one hardware asset;
- a driver for the at least one hardware asset, the driver interfacing the hardware asset with a multi-layer hardware asset management system comprising asset management components;
- a manager, the manager being one of the asset management components of the multi-layer hardware asset management system;
- wherein at least one of the driver or the manager comprise one or more computer-readable media comprising computer-executable instructions directed to steps comprising:
  - generating a packet comprising:
    - a session identifier identifying a communicational session with at least one hardware asset, the communicational session directed to causing the at least one hardware asset to perform a function;
    - a sequence number either identifying an order of the generated packet among multiple other packets, the multiple other packets and the generated packet each comprising at least a portion of a single communication that was packetized across the multiple other packets and the generated packet, or signifying that none of the multiple other packets follow the generated packet;
    - a code comprising either a function code identifying the function requested to be performed by the at least one hardware asset, or a completion code identifying a status associated with a performance of the function by the at least one hardware device; and
    - a payload comprising the at least the portion of the single communication; and
  - transmitting the generated packet to another asset management component, the other asset management component executing at a different layer of the asset management system than an asset management component comprising the computer-executable instructions.

14. The system of claim 13, further comprising a rack manager communicationally coupled to one or more chassis managers, the rack manager being another of the asset management components of the multi-layer hardware asset management system, the chassis managers being at a lower layer of the multi-layer hardware asset management system than the rack manager; wherein the manager is one of the one or more chassis managers.

15. The system of claim 13, wherein the generated packet further comprises: device type information specifying a type of the at least one hardware asset; and a device identifier specifying a unique identifier for the at least one hardware asset.

16. The system of claim 13, wherein the generated packet is a response packet, the generated packet further comprising an address of a sender of a request packet comprising a same session identifier as the session identifier of the generated packet.

17. The system of claim 13, wherein the one or more computer-readable media comprise further computer-executable instructions for:
- receiving a second packet whose structure is equivalent to the generated packet, the received second packet being a request packet requesting the at least one hardware asset to perform the function; and
- generating, in response to receiving the second packet, a third packet whose structure differs from the generated packet and the received second packet, the generated third packet being compatible with the at least one hardware asset, the generated third packet requesting the at least one hardware asset to perform the function.

18. The system of claim 17, wherein the generating the third packet comprises unpacking a payload of the received second packet to obtain the third packet.

19. The system of claim 13, wherein the one or more computer-readable media comprise further computer-executable instructions for receiving a second packet;
- wherein further the computer-executable instructions for generating the packet comprise computer-executable instructions for generating the packet in response to the receiving the second packet;
- and wherein further the single communication, at least a portion of which is in the payload of the generated packet, comprises the received second packet.

20. The system of claim 13, wherein the function comprises at least one of: a status providing function providing a status of at least a portion of the at least one hardware asset, a change setting function directed to changing at least one setting of the at least one hardware asset or a power function directed to turning the at least one hardware asset on or off.

* * * * *